United States Patent [19]

Stroz et al.

[11] Patent Number: 4,634,593

[45] Date of Patent: Jan. 6, 1987

[54] COMPOSITION AND METHOD FOR PROVIDING CONTROLLED RELEASE OF SWEETENER IN CONFECTIONS

[75] Inventors: John J. Stroz, Randolph, N.J.; Wayne J. Puglia, Bayville, N.Y.

[73] Assignee: Nabisco Brands, Inc., Parsippany, N.J.

[21] Appl. No.: 761,205

[22] Filed: Jul. 31, 1985

[51] Int. Cl.$^4$ ............................................. A23G 3/30
[52] U.S. Cl. ........................................ 426/5; 426/99; 426/453; 426/548
[58] Field of Search ................... 426/99, 453, 548, 5, 426/3

[56] References Cited

U.S. PATENT DOCUMENTS

| | | | |
|---|---|---|---|
| 3,508,926 | 4/1970 | Werbin | 426/453 |
| 4,208,431 | 6/1980 | Friello et al. | 426/3 |
| 4,465,694 | 8/1984 | Okada | 426/99 |
| 4,493,849 | 1/1985 | Carroll et al. | 426/3 |
| 4,536,410 | 8/1985 | Vaccaro et al. | 426/3 |

*Primary Examiner*—Jeanette Hunter
*Attorney, Agent, or Firm*—Richard Kornutik

[57] ABSTRACT

A composition and method for providing slowed-down or controlled release of sweetener for confections including an agglomeration of sweetener and an insoluble fat material.

11 Claims, No Drawings

COMPOSITION AND METHOD FOR PROVIDING CONTROLLED RELEASE OF SWEETENER IN CONFECTIONS

BACKGROUND OF THE INVENTION

The present invention relates to the art of providing sweeteners for use in confections and, in particular, to providing controlled release of sweeteners in confections.

It has been a goal in the art of confections to provide confectionary units with sustained sweetness for the full measure of time such confection is in the oral cavity. For those confections consumed or dissipated during the oral residence time, the sustained sweetness is relatively easily achieved by simply providing a uniformly-sweetened confection composition. In the case of chewing gum, however, supplying sustained sweetness throughout the period of chewing is quite difficult because the generally-soluble sweetener material is chewed out of the insoluble base portion as a result of mastication.

For example U.S. Pat. No. 4,370,350 to Fisher, et al. describes a method for producing chewing gum so that an initial burst of sweetness is followed by a sustained sweetness release by homogenizing a portion of a bulk sweetener with the gum base while in a viscous condition followed by stepwise addition of the remaining bulk sweetener after cooling the original homogenous base/sweetener combination. Subsequently-added sweetener layers provide initial sweetness while the homogenous blend of bulk sweetener and base purportedly provide a degree of sustained sweetness.

Similarly, U.S. Pat. No. 4,217,368 to Witzel, et al. describes a chewing gum which has long-lasting sweetness prepared from a gum base mixed with a sweetener which is then further mixed with additional aqueous sweetener.

In both of the above references the slow-down or controlled release is effected by special mixing steps of the sweetener with the gum base. No mention is made, however, of using an insoluble material other than the gum base, such as an insoluble fat material, to effect slowed-down or controlled release of the sweetener from gum composition into the oral cavity.

However, U.S. Pat. No. 3,389,000 to Fujita, et al. describes a nucleoside-5'-phosphate flavoring for food which is protected against degradation by phosphatase by coating with an edible fat. Among the means for coating is included a homogeneously admixing of the nucleoside-5'-phosphate with the coating agent in a melted state followed by spraying the homogeneous mixture off into cool atmosphere. Somewhat relatedly, U.S. Pat. No. 3,647,480 to Cermak discloses a process for preparing a condiment-containing fatty particulate by contacting a condiment in a zone with preformed fatty matrix particles with substantially uncontrolled agglomeration of either the matrix or the resulting composite particles. The contacting operation, which is usually a physical blending, substantially enrobes or sorbs the fatty matrix onto the condiment.

It is an object of the present invention, therefore, to provide a controlled release of sweetener by use of a means other than specially adapted process steps.

SUMMARY OF THE INVENTION

The present invention is a composition of matter and a process for preparing same which provides slowed-down or controlled release of the sweetener from a confection. The composition is an agglomeration in which said sweetener, preferably in the form of a dry particulate, is intimately contacted with an insoluble fat material which is subsequently blended with the confection composition, e.g., gum base and other gum composition ingredients, by a method and at a temperature whereby the agglomeration retains its integrity.

As presently envisaged, the method employed to form the agglomeration is a mix-mulling process in which the sweetener and fat are introduced in a weight ratio of from about 6:1 to about 1.5:1, and preferably from about 4:1 to about 2:1, respectfully.

Sweeteners suitable for use in the present invention include, but are not limited to bulk, sweeteners such as sugar, sugar alcohols such as sorbitol, mannitol and xylitol, hydrogenated starch hydrolysate, and intense sweeteners such as saccharine, saccharine salts, cyclamic acid, salts of cyclamic acid, dipeptide sweeteners such as asparatme, dihydrochalcones, glycyrrhizins, *Stevia rebaudiana*, and 3,4-dihydro-6-methyl-1,2,3-oxathiazin-4-one-2,2-dioxide.

Fat materials which can be used in the present invention encompass any food grade insoluble fat material, but are preferably those which are considered hard, that is those having a softening point at a temperature higher than about 100° F. Such fats include but are not limited to hydrogenated vegetable oils, cocoa butter, and animal fats.

By means of the present invention an organoleptically pleasing gum composition having a sustained sweetness level can be prepared by mixing the sweetener/fat agglomeration using normal gum manufacturing techniques.

For a better understanding of the present invention, together with other and further objects, reference is made to the following description, and its scope will be pointed out in the appended claims.

DETAILED DESCRIPTION OF THE INVENTION

In accordance with the present invention a sweetener/fat system which provides slowed-down or controlled release of sweetener upon mastication can be prepared for use in confections, especially chewing gum. This is achieved by intimately contacting the sweetener with an insoluble fat material to form an agglomeration which can then be mixed in as an ingredient using the normal confection manufacturing process.

Particularly effective sweeteners for use in the present invention are those in the form of a dry particulate, such as sugar, sugar alcohol powder, aspartame, etc. which can be intimately contacted with the fat material. The fat material is preferably one which has a relatively high softening point, e.g., above about 100° F., so that the resulting agglomeration is not dissoluble upon inclusion in a confection composition using normal processing techniques. Furthermore, a hard fat agglomeration is especially useful in chewing gum compositions because it does not noticably effect the chew characteristics of the gum.

Although an agglomeration can be formed in a variety of known methods such as prilling, fluidized agglomerating processes, etc., it has now been found that an especially effective agglomeration results from a mix-mulling process. In this process the sweetener and fat material is subjected to mechanical mix mulling in the substantial absence of added heat and moisture, and at atmospheric pressure.

Mix mulling is a means of obtaining dispersion of dry and wetted solids by a controlled-pressure agitation through a combined kneading, smearing, and spatulate action. By use of this unique mortar and pestle-like process total uniformity and complete homogeneity of incompatible solid components are achieved. While the present invention is not to be considered as limited by any theories proposed herein, it is believed that the mulling action mechanically forces the sweetener and fat material into intimate contact with each other such that, in effect, an agglomeration of such particles is achieved. By means of the above process agglomerate particle size can be directly controlled through pressure control and time of mulling. This is in direct contrast to previous methods of preparing agglomerates which require trial and error evaluation of product particles during such processes.

Energy requirements are minimized because of the low amount of power needed to drive only the free-turning muller wheels, and because the agglomerate does not have to be heated during mulling. Furthermore, the mulling action insures full utilization of all the raw materials as well as providing a high degree of control over the development of the mix. This process is to be contrasted with other agglomerating methods known in the art which require constant addition of heat and/or usually blowing a high volume updraft of air, or other suitable inert gas, to form the agglomerate particles.

In order to use all of the ingredient material for forming the agglomerate and in order to form a cohesive agglomerate capable of withstanding normal processing the ratio of sweetener to fat material should not be more than about 6:1, and preferably from about 4:1 to about 2:1. Naturally, when using intense sweeteners, the ratio of sweetener to fat will be quite low, thus incurring another problem of effecting an adequate mix by mechanical process. In this case, the artisan will want to blend the intense sweetener with a less intense natural sweetener prior to introducing it to the mix mulling process in order to insure thorough dispersement.

Upon formation of the insoluble sweetener/fat agglomeration, other ingredients including sweeteners, dry or moisture-containing, can be added along with the agglomerate to the desired confection composition.

EXAMPLES

Normally dry crystalline sugar in an amount of 100 lbs, is introduced to a mix-muller (a Simpson Mix-Muller made by the National Engineering Company) along with hydrogenated vegetable oil in an amount of 40 lbs. The ratio by weight of sugar to fat material is about 2.5:1.

The mixture is subjected to mulling action at atmospheric pressure for about 20 minutes. A firm particulate agglomerate is formed which can be readily incorporated into a confection composition, especially chewing gum.

In order to determine the effectiveness of the agglomerate prepared according to the invention, the particulate produced in the above example is incorporated in a styrene-butadiene rubber (SBR) based chewing gum according to the formula set forth below:

| Component | Percent by weight of Each Component |
| --- | --- |
| SBR Gum Base | 20 to 30 |
| Sugar/Fat Agglomerate | 20 to 50 |
| Sugar | 20 to 50 |
| Corn Syrup (44 Be') | 10 to 20 |
| Flavouring | 0.1 to 0.5 |
| Softener | 0.3 to 1.5 |

The gum base is first heated to a temperature of from about 170° F. to about 200° F. to reduce the viscosity, after which the corn syrup, sugar, flavoring and softener are added thereby reducing the temperature of the mass to about 150° F.

The sugar/fat agglomerate is then introduced and mixed with the mass to form a smooth, soft chewing gum having good organoleptic qualities and flavor. As compared to a similar product having the same level of sugar content, but which is devoid of the sugar/fat agglomerate of the present invention; the product of the present invention provides a significantly more sustained or prolonged level of sweetness perception to the user thereof. Alternatively, the sugar/fat agglomerate may be added along with or prior to the other ingredients, and still provide the same desired results.

Chewing gums incorporating the present invention can also be prepared using gum bases based on polyisobutylene, isobutylene-isoprene copolymer, etc. When using intensive sweeteners, an amount of the less intense sweeteners such as natural sweeteners should be used to insure the presence of a sufficient amount of sweetener bulk to effect thorough and substantially homogeneous mechanical mixing.

Thus, while there have been described what are presently believed to be the preferred embodiments of the invention, those skilled in the art will realize that changes and modifications may be made thereto without departing from the spirit of the invention, and it is intended to claim all such changes and modifications as fall within the scope of the invention.

We claim:

1. A process for effecting controlled release of a dry particulate sweetener from a chewing gum composition comprising
   forming an agglomeration in which said sweetener is intimately contacted by mix-mulling with an insoluble fat material having a softening point of higher than about 100° F. at a weight ratio of said sweetener to said fat material of about 6:1 to 1.5:1, and
   mixing said sweetener/fat agglomeration with gum base and other chewing gum composition ingredients to form a chewing gum composition at a temperature and by a method whereby said agglomeration retains its integrity in said gum composition.

2. The process of claim 1 wherein said sweetener is selected from the group consisting of sugar, sugar alcohol, hydrogenated starch hydrolysate, saccharine, saccharine salts, cyclamic acid, salts of cyclamic acid, dipeptide sweeteners, dihydrochalcone, glycyrrhizin, *Stevia rebaudiana*, and 3,4-dihydro-6-methyl-1-1,2,3-oxathiazin-4-one-2,2-dioxide.

3. The process of claim 1 wherein said fat is selected from the group consisting of hydrogenated vegetable oils, cocoa butter, and animal fats.

4. The process of claim 1 wherein said weight ratio is from about 4:1 to about 2:1.

5. A process as in claim 1 which is conducted in the substantial absence of added moisture.

6. A composition of matter for effecting controlled release of a sweetener in a confection comprising
a mix-mulled agglomeration of a dry sweetener and an insoluble fat material at a weight ratio of said sweetener to said fat material of about 6:1 to 1.5:1, said fat material having a softening point higher than about 100° F.

7. The composition of claim 6 wherein said weight ratio is from about 4:1 to about 2:1.

8. The composition of claim 6 wherein said sweetener is selected from the group consisting of sugar, sugar alcohol, hydrogenated starch hydrolysate, saccharine, saccharine salts, cyclamic acid, salts of cyclamic acid, dipeptide sweeteners, dihydrochalcone, glycyrrhizin, *Stevia rebaudiana*, and 3,4-dihydro-6-methyl-1,2,3-oxathiazin-4-one-2,2-dioxide.

9. The composition of claim 6 wherein said fat is selected from the group consisting of hydrogenated vegetable oils, cocoa butter, and animal fats.

10. A confection comprising the controlled release sweetener of claim 6.

11. A confection as in claim 10 which is chewing gum.

* * * * *